United States Patent
Lection et al.

(10) Patent No.: US 10,712,827 B2
(45) Date of Patent: Jul. 14, 2020

(54) CLIENT DEVICE MOTION CONTROL VIA A VIDEO FEED

(71) Applicant: INTERNATIONAL BUSINESS MACHINES CORPORATION, Armonk, NY (US)

(72) Inventors: David B. Lection, Raleigh, NC (US); Mark B. Stevens, Austin, TX (US); John D. Wilson, League City, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 151 days.

(21) Appl. No.: 15/062,017

(22) Filed: Mar. 4, 2016

(65) Prior Publication Data

US 2017/0147076 A1    May 25, 2017

Related U.S. Application Data

(63) Continuation of application No. 14/946,630, filed on Nov. 19, 2015, now Pat. No. 10,353,473.

(51) Int. Cl.
*G06F 3/01* (2006.01)
*G06F 3/00* (2006.01)
(Continued)

(52) U.S. Cl.
CPC .............. *G06F 3/017* (2013.01); *G06F 3/005* (2013.01); *G06K 9/00335* (2013.01); *H04N 7/181* (2013.01)

(58) Field of Classification Search
CPC .... G06F 3/017; G06F 3/04883; G06F 3/0487; G06F 3/0488; G06F 3/04886; G06F 2203/04808
See application file for complete search history.

(56) References Cited

U.S. PATENT DOCUMENTS 7,702,130 B2 *  4/2010  Im ........................... G06F 3/017
                                                                    382/103
7,721,207 B2    5/2010  Nilsson
(Continued)

FOREIGN PATENT DOCUMENTS

DE      102013206340 A1    10/2014
GB         2498228 A         7/2013

OTHER PUBLICATIONS

Fogarty, Kevin. 3D Tracker Works Through Walls, Allows Gesture Control of Games. Dice, Dec. 11, 2013. [4 pages] <http://insights.dice.com/2013/12/11/3d-tracker-works-through-walls-allows-gesture-control-of-games>.

(Continued)

*Primary Examiner* — William Lu
(74) *Attorney, Agent, or Firm* — The Steadman Law Firm PLLC

(57) ABSTRACT

An approach is described for enabling motion control of a client device, such as a mobile device, via a video feed transmitted from one or more video capture devices. An associated method may include establishing, via a communications network, a communication session between a client device and one or more video capture devices. The method further may include identifying a user of the client device via the one or more video capture devices and negotiating parameters of a video feed for transmission from the one or more video capture devices to the client device via the communication session. The method further may include, upon transmission of the video feed from the one or more video capture devices to the client device, facilitating control of the client device in response to any device control gesture received from the user based upon the video feed.

19 Claims, 6 Drawing Sheets

(51) Int. Cl.
*G06K 9/00* (2006.01)
*H04N 7/18* (2006.01)

(56) References Cited

U.S. PATENT DOCUMENTS

| | | | | |
|---|---|---|---|---|
| 8,615,108 | B1* | 12/2013 | Stoppa | G06K 9/4671 |
| | | | | 382/103 |
| 8,717,401 | B1* | 5/2014 | Gossweiler, III | H04L 12/1818 |
| | | | | 348/14.01 |
| 8,766,912 | B2 | 7/2014 | Kim | |
| 8,776,145 | B2* | 7/2014 | Hyde | H04N 21/4126 |
| | | | | 725/74 |
| 8,866,895 | B2 | 10/2014 | Friedlander et al. | |
| 8,878,807 | B2 | 11/2014 | Ludwig | |
| 9,066,129 | B2 | 6/2015 | Connelly et al. | |
| 9,148,687 | B2 | 9/2015 | Friedlander et al. | |
| 9,215,395 | B2 | 12/2015 | Herdy | |
| 9,563,201 | B1* | 2/2017 | Tofte | G05D 1/0038 |
| 9,942,739 | B2 | 4/2018 | Bozik et al. | |
| 9,992,470 | B1 | 6/2018 | Hofmann | |
| 10,048,762 | B2 | 8/2018 | Lesner | |
| 10,146,922 | B2 | 12/2018 | Guidotti et al. | |
| 2002/0009073 | A1* | 1/2002 | Furukawa | H04L 65/4076 |
| | | | | 370/352 |
| 2004/0031058 | A1* | 2/2004 | Reisman | G06F 16/954 |
| | | | | 725/112 |
| 2004/0101212 | A1* | 5/2004 | Fedorovskaya | G06F 17/30265 |
| | | | | 382/305 |
| 2004/0205004 | A1 | 10/2004 | Bahl et al. | |
| 2005/0101314 | A1* | 5/2005 | Levi | H04L 63/0861 |
| | | | | 455/423 |
| 2008/0049624 | A1* | 2/2008 | Ray | H04L 45/22 |
| | | | | 370/241 |
| 2008/0273764 | A1* | 11/2008 | Scholl | G07C 9/00158 |
| | | | | 382/118 |
| 2009/0079813 | A1* | 3/2009 | Hildreth | H04N 7/147 |
| | | | | 348/14.03 |
| 2010/0195666 | A1 | 8/2010 | Adamczyk et al. | |
| 2010/0245536 | A1* | 9/2010 | Huitema | H04N 7/147 |
| | | | | 348/14.08 |
| 2011/0035287 | A1* | 2/2011 | Fox | G06Q 30/02 |
| | | | | 705/14.69 |
| 2011/0154266 | A1* | 6/2011 | Friend | A63F 13/06 |
| | | | | 715/863 |
| 2012/0124516 | A1 | 5/2012 | Friedman | |
| 2012/0197439 | A1* | 8/2012 | Wang | B25J 9/1689 |
| | | | | 700/259 |
| 2012/0269239 | A1* | 10/2012 | Sabelkin | H04N 19/60 |
| | | | | 375/219 |
| 2012/0277001 | A1* | 11/2012 | Lansdale | A63F 13/213 |
| | | | | 463/39 |
| 2013/0013318 | A1* | 1/2013 | Huang | G06F 3/1454 |
| | | | | 704/275 |
| 2013/0155237 | A1 | 6/2013 | Paek et al. | |
| 2013/0229508 | A1* | 9/2013 | Li | G06F 1/3287 |
| | | | | 348/77 |
| 2014/0006794 | A1 | 1/2014 | Odessky et al. | |
| 2014/0229835 | A1* | 8/2014 | Ravine | H04L 65/60 |
| | | | | 715/720 |
| 2014/0309871 | A1* | 10/2014 | Ricci | B60R 25/1004 |
| | | | | 701/36 |
| 2015/0009124 | A1 | 1/2015 | Antoniac | |
| 2015/0020135 | A1* | 1/2015 | Frusina | H04N 21/4621 |
| | | | | 725/116 |
| 2015/0121250 | A1* | 4/2015 | Waxman | G06F 3/04817 |
| | | | | 715/753 |
| 2015/0256798 | A1* | 9/2015 | Chen | H04N 7/181 |
| | | | | 348/159 |
| 2016/0088286 | A1* | 3/2016 | Forsythe | G06F 17/30528 |
| | | | | 348/46 |
| 2017/0060251 | A1 | 3/2017 | Choi | |

OTHER PUBLICATIONS

Israel, Shel. Why Apple Bought PrimeSense. Forbes, Nov. 25, 2013. [5 pages]. <http://www.forbes.com/sites/shelisrael/2013/11/25/why-would-apple-buy-primesense>.

List of IBM Patents or Patent Applications Treated as Related, Mar. 4, 2016 [2 pages].

* cited by examiner

CLIENT DEVICE MOTION CONTROL VIA A VIDEO FEED

BACKGROUND

The various embodiments described herein generally relate to motion control of a client device. More specifically, the various embodiments describe techniques for enabling motion control of a client device, such as a mobile device, via a video feed transmitted from one or more video capture devices.

In certain scenarios, a user may be unable to feasibly control a client device via buttons or voice commands. For instance, such user may not be able to physically access a mobile device or other computing device, or such user may be unable to effectively provide voice commands to a mobile device in a crowded space having significant ambient noise. In such scenarios, an alternative technique for controlling a client device may increase accessibility and efficiency.

SUMMARY

The various embodiments described herein provide techniques for enabling motion control of a client device (e.g., a mobile device) via a video feed transmitted from one or more video capture devices. An associated method may include establishing a communication session between a client device and one or more video capture devices. The communication session may be established via a communications network. The method further may include identifying a user of the client device via the one or more video capture devices and negotiating parameters of a video feed for transmission from the one or more video capture devices to the client device via the communication session. The method further may include, upon transmission of the video feed from the one or more video capture devices to the client device, facilitating control of the client device in response to any device control gesture received from the user based upon the video feed.

In an embodiment, the method further may include discontinuing the communication session and the video feed upon occurrence of a discontinuation event. According to such embodiment, the discontinuation event may include at least one of (i) receipt of a discontinuation request from the user or (ii) confirmation that the user has left a specified optical range of each of the one or more video capture devices. Additionally or alternatively, the discontinuation event may include satisfaction of one or more discontinuation rules associated with the video feed. The one or more discontinuation rules may pertain to at least one of time allotment, cost allotment, a priority metric change, or a security risk change.

In an embodiment, the method step of establishing the communication session may include initiating the communication session upon receiving from the user one or more initiation gestures via at least one of the one or more video capture devices. In a further embodiment, the method step of establishing the communication session may include broadcasting availability of the one or more video capture devices to the client device upon determining that the user is within a specified optical range of at least one of the one or more video capture devices. In a further embodiment, the method step of establishing the communication session may include initiating the communication session upon receipt of a signal from the client device indicating that the client device is within a predetermined geographical range of at least one of the one or more video capture devices.

In an embodiment, the method step of identifying the user of the client device may include confirming presence of the user via at least one of (i) recognition of one or more physical characteristics associated with the user or (ii) confirmation of a location of the client device relative to the one or more video capture devices. In a further embodiment, the method step of identifying the user of the client device may include, upon determining that the user is within a specified optical range of at least one of the one or more video capture devices, sending to the client device an identification gesture request unique for the user. According to such embodiment, the method step of identifying the user of the client device further may include, upon receiving from the user one or more identification gestures corresponding to the identification gesture request within a predetermined identification time period via at least one of the one or more video capture devices, confirming presence of the user.

In an embodiment, the method step of negotiating parameters of the video feed may include sending to the client device one or more video feed transmission terms and a confirmation gesture request for the user. According to such embodiment, the method step of negotiating parameters further may include, upon receiving from the user one or more confirmation gestures corresponding to the confirmation gesture request within a predetermined confirmation time period via at least one of the one or more video capture devices, sending a confirmation notification to the client device.

An additional embodiment includes a computer program product including a computer readable storage medium having program instructions embodied therewith, wherein the program instructions may be executable by a computing device to cause the computing device to perform one or more steps of above recited method. A further embodiment includes a system having a client device, one or more video capture devices, and a server including at least one processor and a memory storing an application program, which, when executed on the at least one processor, performs one or more steps of the above recited method.

BRIEF DESCRIPTION OF THE DRAWINGS

So that the manner in which the above recited aspects are attained and can be understood in detail, a more particular description of embodiments, briefly summarized above, may be had by reference to the appended drawings.

Note, however, that the appended drawings illustrate only typical embodiments of this invention and are therefore not to be considered limiting of its scope, for the invention may admit to other equally effective embodiments.

DETAILED DESCRIPTION

Figure 1A:
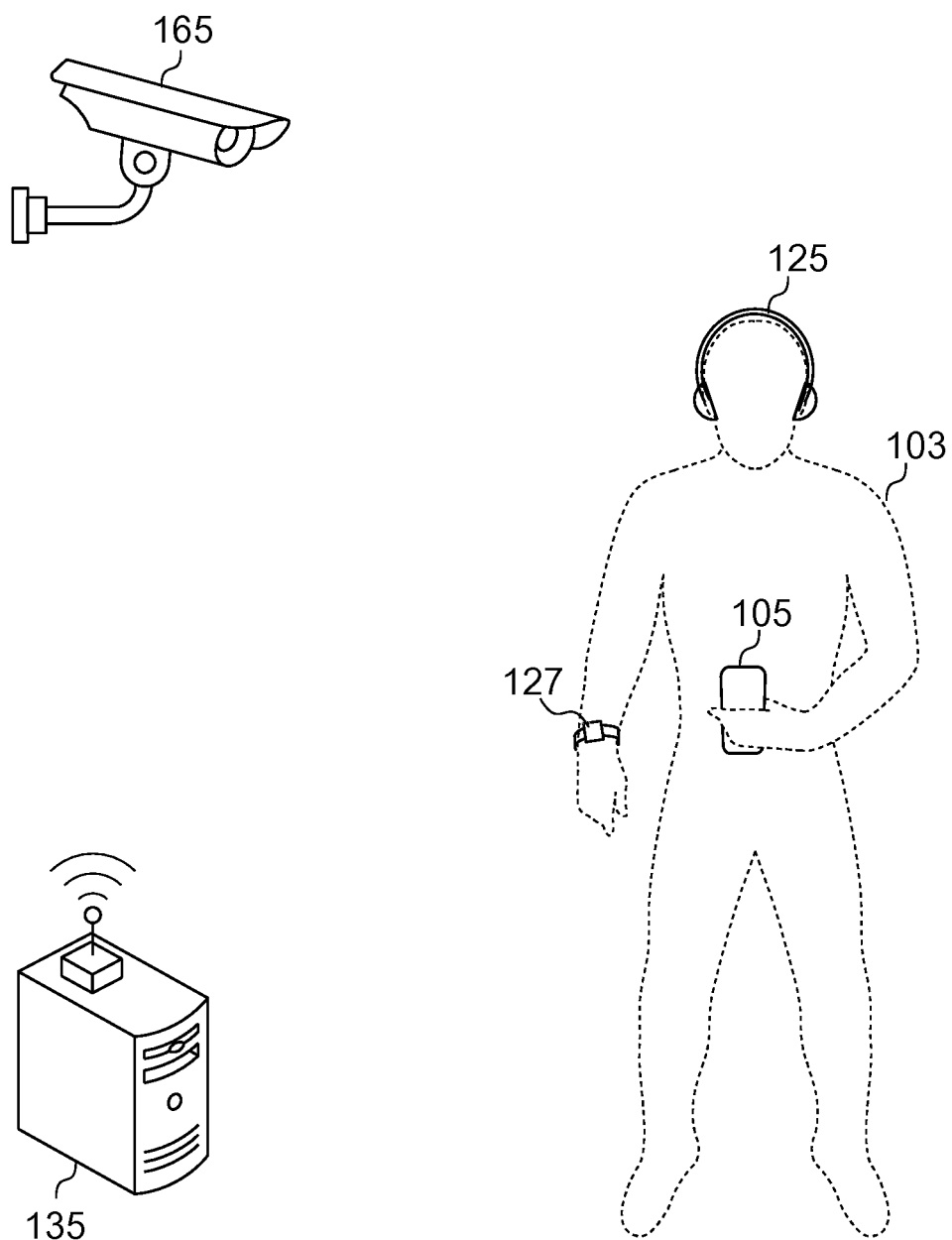
FIG. 1A illustrates a motion control environment, according to a first embodiment.

The various embodiments described herein are directed to techniques for enabling motion control of a client device via a video feed transmitted from one or more video capture devices. The various embodiments focus in particular upon the use of gestures provided by a user of a client device in conjunction with a video feed provided by one or more video capture devices in order to control the client device. A client device according to the various embodiments described herein may be a mobile device (e.g., a smart phone, a feature phone, a tablet device, a laptop, etc.). Alternatively, a client device may be a stationary device within proximity of at least one of the one or more video capture devices.

The various embodiments described herein may have advantages over conventional client device control techniques. Specifically, by enabling control of client device functions via gestures, the various embodiments may facilitate client device control in scenarios in which buttons associated with the device are unavailable or inaccessible. For instance, the various embodiments may enable client device control when the device is located in a clothing pocket of a user or when the user is wearing mittens in inclement weather. Furthermore, the various embodiments may enable client device control in scenarios in which voice commands are difficult to process. For instance, the various embodiments may facilitate client device control when a user attempts to communicate in a crowded or noisy location. Some of the various embodiments may not include all such advantages, and such advantages are not necessarily required of all embodiments.

In the following, reference is made to various embodiments of the invention. However, it should be understood that the invention is not limited to specific described embodiments. Instead, any combination of the following features and elements, whether related to different embodiments or not, is contemplated to implement and practice the invention. Furthermore, although embodiments may achieve advantages over other possible solutions and/or over the prior art, whether or not a particular advantage is achieved by a given embodiment is not limiting. Thus, the following aspects, features, embodiments and advantages are merely illustrative and are not considered elements or limitations of the appended claims except where explicitly recited in a claim(s) Likewise, reference to "the invention" shall not be construed as a generalization of any inventive subject matter disclosed herein and shall not be considered to be an element or limitation of the appended claims except where explicitly recited in a claim(s).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a Blu-ray disc, a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions also may be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The various embodiments described herein may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in the cloud, without regard for the underlying physical systems (or locations of those systems) used to provide the computing resources.

Typically, cloud computing resources are provided to a user on a pay-per-use basis, where users are charged only for the computing resources actually used (e.g., an amount of storage space consumed by a user or a number of virtualized systems instantiated by the user). A user can access any of the resources that reside in the cloud at any time, and from anywhere across the Internet. In context of this disclosure, workloads of a client device or server system running an application according to the various embodiments described herein may be deployed to a computing cloud. Moreover, cloud-based database systems, virtual machines, and a variety of other server applications may be used to manage such workloads.

Further, particular embodiments describe techniques for enabling motion control of a client device via a video feed transmitted from one or more video capture devices. However, it should be understood that the techniques described herein may be adapted to a variety of purposes in addition to those specifically described herein. Accordingly, references to specific embodiments are included to be illustrative and not limiting.

FIG. 1A illustrates a motion control environment 100, according to an embodiment. Motion control environment 100 may include a user 103. User 103 may be in possession of a client device 105, an audio device 125 (e.g., headphones) and a vibration device 127 (e.g., a watch). Furthermore, motion control environment 100 may include a motion control server 135, which may facilitate motion control of client device 105. Motion control environment 100 further may include a video capture device 165, which may capture, record, or otherwise process video data and may create and transmit a video feed based upon such video data. Although shown as a single device, video capture device 165 is included to be representative of a single video capture device or multiple video capture devices. In an embodiment, client device 105 may be a mobile device (e.g., a smart phone, a feature phone, a tablet device, or a laptop) or a stationary device within proximity of video capture device 165. In a further embodiment, client device 105 may be a thin client that may depend upon motion control server 135, video capture device 165, or another external computing device to fulfill computational roles.

Figure 1B:
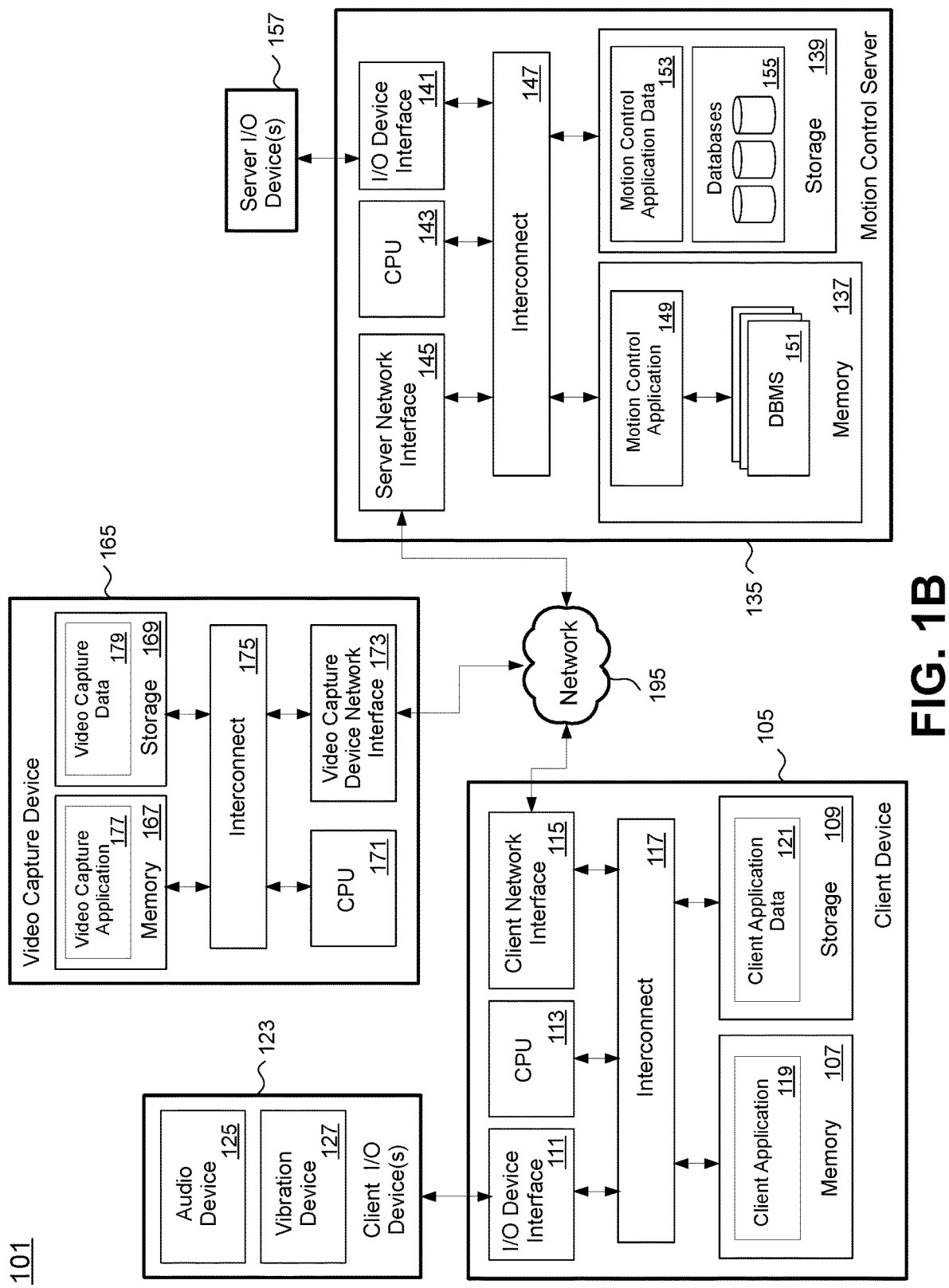
FIG. 1B illustrates a computing infrastructure for the motion control environment illustrated in FIG. 1A, according to an embodiment.

FIG. 1B illustrates a computing infrastructure 101 for motion control environment 100, according to an embodiment. As shown, computing infrastructure 101 includes client device 105, motion control server 135, and video capture device 165, each connected to a communications network 195. Computing infrastructure 101 is an example and is not intended to be limiting. Illustratively, client device 105 may include a memory 107, storage 109, input/output (I/O) device interface 111, a central processing unit (CPU) 113, and a client network interface 115, all of which may be interconnected via interconnect 117 (e.g., a bus). Although shown as a single computing system, client device 105 is included to be representative of a single client computing system or multiple client computing systems. Memory 107 may include a client application 119. Client application 119 may be an online/network application configured for interfacing with motion control server 135, video capture device 165, and other computing systems. Storage 109 may include client application data 121 associated with client application 119. I/O device interface 111 may be communicatively coupled to one or more client I/O devices 123. Client I/O devices 123 may include audio device 125 and vibration device 127. Optionally, client I/O devices 123 may be directly linked to network 195. CPU 113 is included to be representative of a single CPU, multiple CPUs, a single CPU having multiple processing cores, and the like. Client network interface 115 may receive data from and transmit data to server 135 or video capture device 165 via network 195.

Motion control server 135 may include a memory 137, storage 139, I/O device interface 141, a CPU 143, and a server network interface 145, all of which may be interconnected via interconnect 147 (e.g., a bus). Although shown as a single computing system, motion control server 135 is included to be representative of a single server system or multiple server systems. Memory 137 may include a motion control application 149. Motion control application 149 may interface with at least one of a database management system, a discussion forum, a social network, a product marketplace, or a weblog. According to an embodiment, functionality of motion control server 135 (e.g., some or all of the functionality of motion control application 149) may be incorporated into client application 119 of client device 105.

As illustrated in FIG. 1B, motion control application 149 interfaces with a database management system (DBMS) 151, also included in memory 137. DBMS 151 is included be representative of a single database system or multiple database systems. Storage 139 may include motion control application data 153 and databases 155. Motion control application 149 may generate and process motion control application data 153 based on interaction with client device 105 or video capture device 165. Motion control application 149 may send database requests to DBMS 151, and motion control application 149 may process results returned by DBMS 151 to generate motion control application data 153. DBMS 151 may include a software application configured to manage databases 155. Databases 155 may include one or more relational databases. Additionally, databases 155 may include one or more ontology trees or other ontological structures. While FIG. 1B illustrates three databases 155, computing infrastructure 101 may include any number of databases. According to an embodiment, DBMS 151 may send requests to remote databases (not shown) via network 195.

I/O device interface 141 may be communicatively coupled to one or more server I/O devices 157. CPU 143 is included to be representative of a single CPU, multiple CPUs, a single CPU having multiple processing cores, and the like. Server network interface 145 may receive data from and transmit data to client device 105 or video capture device 165 via network 195. Specifically, motion control application 149 may accept requests sent by client device 105 or video capture device 165 to motion control server 135 and may transmit data to client device 105 or video capture device 165 via server network interface 145.

Video capture device 165 may include a memory 167, storage 169, a central processing unit (CPU) 171, and an video capture device network interface 173, all of which may be interconnected via interconnect 175 (e.g., a bus). Video capture device 165 may include a single computing device or multiple computing devices. Memory 167 may include a video capture application 177, which may be an application for processing video data captured by video capture device 165. Video capture application 177 may be an online application configured for interfacing with client device 105, motion control server 135, and other computing systems. Storage 169 may include video capture data 179 associated with video capture application 177. CPU 171 is included to be representative of a single CPU, multiple CPUs, a single CPU having multiple processing cores, and the like. Video capture device network interface 173 may receive data from and transmit data to client device 105 or motion control server 135 via network 195.

In an embodiment, functions related to motion control processing may be executed externally to motion control server 135. According to such alternative embodiment, motion control application 149 may communicate with applications external to motion control server 135 in order to send information or to obtain information or data created as a result of motion control processing. Furthermore, according to such alternative embodiment, a database management system and one or more databases external to motion control server 135 may provide information or capabilities necessary for motion control processing.

Figure 2:
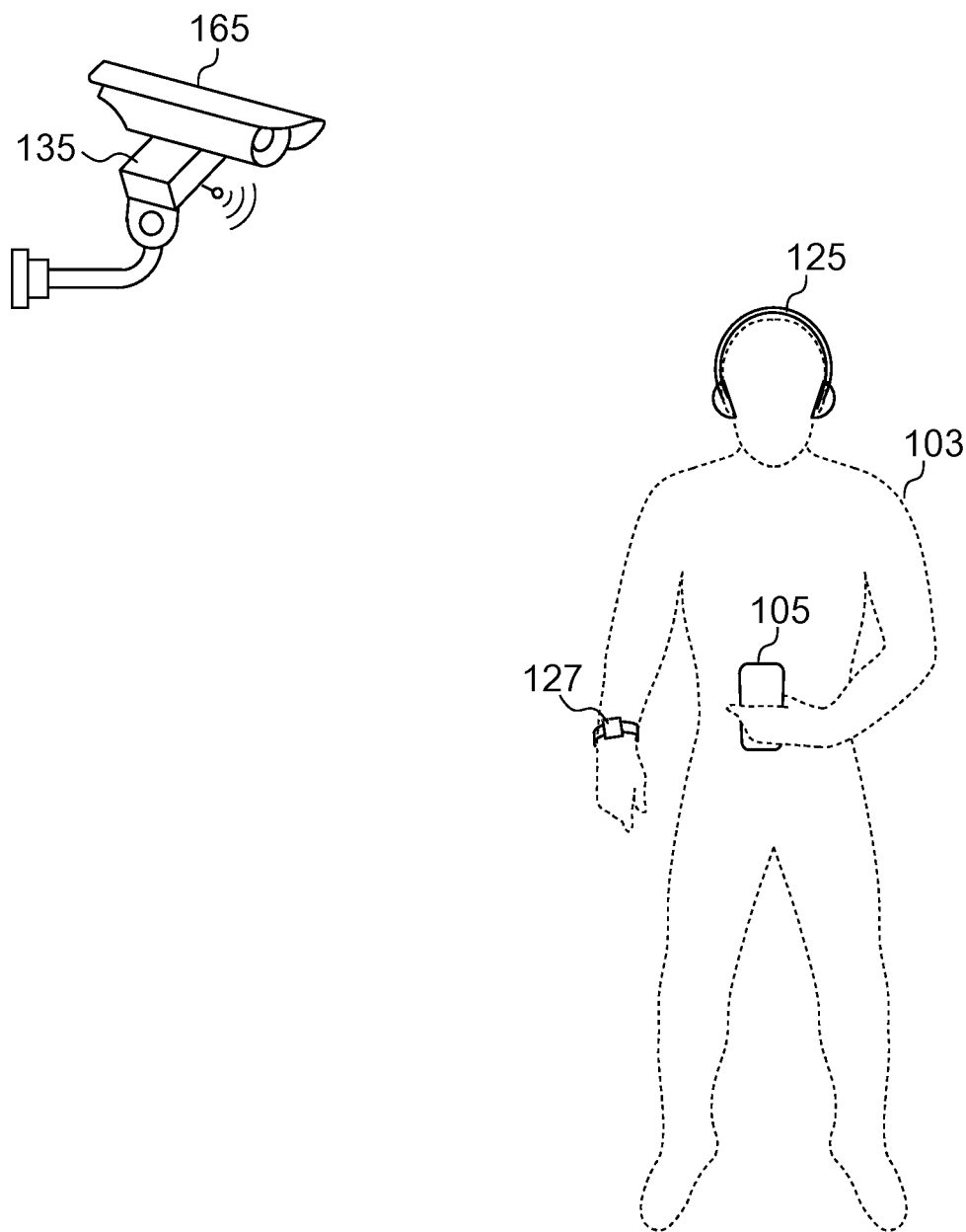
FIG. 2 illustrates a motion control environment, according to a second embodiment.

Although motion control server 135 is shown as a separate component in motion control environment 100 and computing infrastructure 101, according to an alternative embodiment some or all of the components or functionality of motion control server 135 may be incorporated into video capture device 165 or into another computing system. FIG. 2 illustrates a motion control environment 200, in which motion control server 135 is incorporated into video capture device 165.

Figure 3:
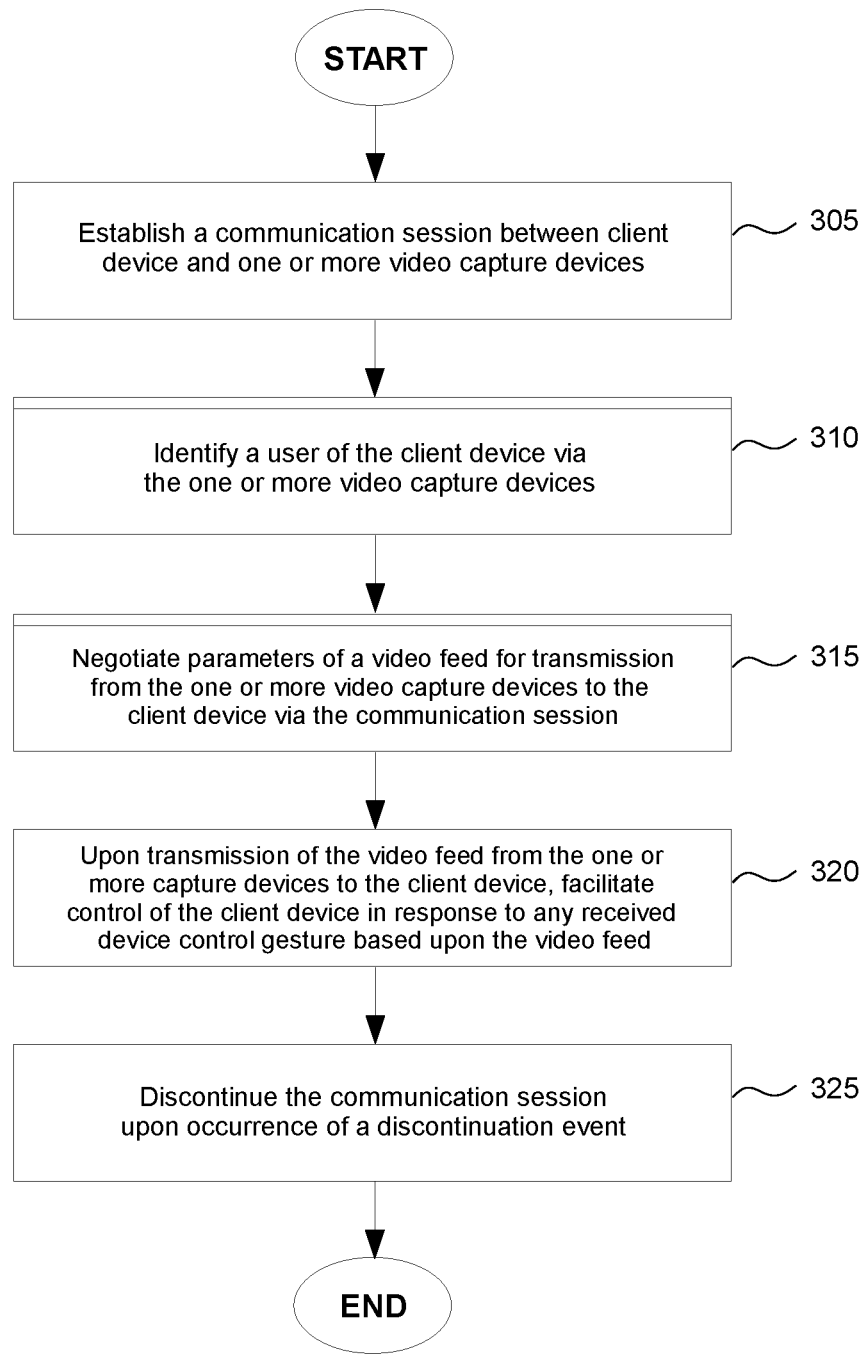
FIG. 3 illustrates a method of enabling gesture control of a client device via a video feed transmitted from one or more video capture devices, according to an embodiment.

FIG. 3 illustrates a method 300 of enabling motion control of a client device in a motion control environment (e.g., client device 105 in motion control environment 100), according to an embodiment. A motion control application of a motion control server in the motion control environment (e.g., motion control application 149 of motion control server 135 in motion control environment 100) may enable motion control of the client device according to the method 300. The motion control application may be part of a computing infrastructure for the motion control environment (e.g., computing infrastructure 101 for motion control environment 100). According to the method 300, the motion control application may enable motion control of the client device via a video feed created by and transmitted from one or more video capture devices in the motion control environment (e.g., video capture device 165 in motion control environment 100).

The method 300 may begin at step 305, where the motion control application may establish a communication session between the client device and the one or more video capture devices. The motion control application may establish the communication session via a communications network (e.g., network 195 in computing infrastructure 101). The motion control application may establish the communication session according to step 305 in one or more of various ways. In an embodiment, the motion control application may establish the communication session by initiating the communication session upon receiving from a user of the client device one or more initiation gestures via at least one of the one or more video capture devices. According to such embodiment, in response to one or more initiation gestures provided by the user of the client device, at least one of the one or more video capture devices may capture the one or more initiation gestures and may relay them to the motion control application, which in turn may determine based upon the one or more initiation gestures that the user wishes to establish communication. In a further embodiment, the motion control application may establish the communication session by broadcasting availability of the one or more video capture devices to the client device upon determining that the user of the client device is within a specified optical range of at least one of the one or more video capture devices. According to such embodiment, the motion control application may broadcast availability of the one or more video capture devices via standard communication protocols and may establish the communication session upon receiving an affirmative response from either the client device (e.g., via a confirmation message) or the user of the client device (e.g., via one or more initiation gestures captured by at least one of the one or more video capture devices). In a further embodiment, the motion control application may establish the communication session by initiating the communication session upon receipt of a signal from the client device indicating that the client device is within a predetermined geographical range of at least one of the one or more video capture devices. According to such embodiment, the client device may have access to information (e.g., from a geographical database) pertaining to the respective locations and capabilities of each of the one or more video capture devices and may send a signal requesting establishment of communication upon arrival within a predetermined geographical range of at least one of the one or more video capture devices. In a further embodiment, the motion control application may establish the communication session upon receipt of a communication session query from the client device. According to such embodiment, a communication session query may be sent from the client device at regular time intervals or alternatively may be sent from the client device in response to a user request.

At step 310, the motion control application may identify the user of the client device via the one or more video capture devices. In an embodiment, the motion control application may identify the user of the client device upon confirming that the user is the only user within proximity of the one or more capture devices. In a further embodiment, the motion control application may identify the user of the client device among other users within proximity of the one or more video capture devices by confirming presence of the user via recognition of one or more physical characteristics associated with the user. For instance, the motion control application may confirm the presence of the user via one or more facial characteristics associated with the user. Additionally or alternatively, the motion control application may confirm the presence of the user via one or more distinguishing marks associated with the user (e.g., birthmarks). Additionally or alternatively, the motion control application may confirm the presence of the user via one or more articles of clothing (e.g., a distinctive sweater) or items carried by the user (e.g., a backpack). Additionally or alternatively, the motion control application may confirm presence of the user via confirmation of a location of the client device relative to the one or more video capture devices. The motion control application may confirm the location of the client device by using detailed electronic location data (e.g., obtained via Global Positioning System (GPS), triangulation, tags, etc.) overlaid with video content captured from at least one of the one or more video capture devices. For instance, the motion control application may determine from detailed electronic data overlaid with video content that the client device is located a certain distance away from a certain video capture device among the one or more video capture devices and furthermore that the client device is oriented at a certain angle with respect to the certain video capture device, and based upon such determination the motion control application may verify that the user is in possession of the client device within view of the certain video capture device. A further embodiment pertaining to identifying the user of the client device via the one or more video capture devices according to step 310 is described herein in a method 400.

According to an embodiment, upon establishment of the communication at step 305 and/or upon identification of the user at step 310, the motion control application may send one or more notifications to the user of the client device indicating that the communication session has commenced. Specifically, the motion control application may send one or more notification signals to I/O devices communicably coupled to the client device (e.g., client I/O devices 123 in computing infrastructure 101). For instance, the motion control application may send an audio signal in the form of a tone or a computerized voice to an audio device (e.g., audio device 125) communicably coupled to the client device to indicate to the user that the communication session has commenced. As another example, the motion control application may send a vibration signal to a vibration device (e.g., vibration device 127) communicably coupled to the client device to indicate to the user that the communication session has commenced.

At step 315, the motion control application may negotiate parameters of a video feed for transmission from the one or more video capture devices to the client device via the communication session. Video feed parameters to be negotiated at step 315 may include one or more terms to be accepted by the user of the client device. The video feed may include raw video data as well as metadata describing any gesture, event, or other attribute with respect to the client device or the user of the client device that may be decoded based upon the raw video data. Furthermore, the video feed may include any device control gesture received from the user and captured via one or more cameras respectively associated with the one or more video capture devices. An embodiment pertaining to negotiating parameters of the video feed according to step 315 is described herein in a method 500.

At step 320, upon transmission of the video feed from the one or more video capture devices to the client device, the motion control application may facilitate control of the client device in response to any device control gesture received from the user of the client device based upon the video feed. In an embodiment, the one or more video capture devices may transmit the video feed to the motion control application, and the motion control application in turn may transmit the video feed to the client device. More specifically, one or more video capture applications among the one or more video capture devices (e.g., video capture application 177 of video capture device 165) may transmit the video feed to the motion control application, and the motion control application in turn may transmit the video feed to a client application of the client device (e.g., client application 119 of client device 105). In an alternative embodiment, the one or more video capture devices may transmit the video feed directly to the client device. More specifically, one or more video capture applications among the one or more video capture devices may transmit the video feed directly to the client application of the client device. According to both embodiments, the one or more video capture devices may ensure transmission of the video feed and any data related thereto to the motion control application so that the motion control application may facilitate control of the client device according to step 320. The motion control application may facilitate either direct control or indirect control of the client device.

According to an embodiment, the motion control application may facilitate direct control of the client device according to step 320 by sending one or more control signals or events to the client device in response to any device control gesture received from the user. According to such embodiment, the video feed transmitted to the client device may serve as a guide for the user of the client device to ensure that any device control gesture is properly received by the one or more video capture devices. For instance, in the event that the user of the client device is only partially in view of a certain video capture device among the one or more video capture devices, the video feed may serve to alert the user of the issue, and in response the user may relocate to a position fully in view of the certain video capture device.

According to one implementation of the direct control embodiment, upon receipt of the video feed from the one or more video capture devices, the motion control application may decode raw video data from the video feed to determine the presence of any device control gesture received from the user by at least one of the one or more video capture devices, may create one or more control signals or events based upon such decoding, and then may send to the client device the one or more control signals or events. According to another implementation of the direct control embodiment, a certain video capture device among the one or more video capture devices may decode raw video data from the video feed to determine the presence of any device control gesture received from the user and then may send to the motion control application gesture metadata based upon the decoded video feed as well as the raw video data. Based upon such gesture metadata, the motion control application in turn may create one or more control signals or events and then may send to the client device the one or more control signals or events. According to a further implementation of the embodiment, upon receipt of the video feed from the one or more video capture devices, the motion control application may send the video feed to another device in the motion control environment, which in turn may decode raw video data from the video feed to determine the presence of any device control gesture received from the user and then may return to the motion control application gesture metadata based upon the decoded video feed. Based upon such gesture metadata received from the other device in the motion control environment, the motion control application in turn may create one or more control signals or events and then may send to the client device the one or more control signals or events.

According to an alternative embodiment, the motion control application may facilitate indirect control of the client device according to step 320 by assisting with client device control. According to such alternative embodiment, the client device may directly control one or more device settings via the video feed in response to a device control gesture received from the user, and the motion control application may facilitate indirect control of the client device by ensuring that the video feed is consistently transferred from the one or more video capture devices to the client device in accordance with the parameters negotiated at step 315. Furthermore, according to such alternative embodiment, the video feed transmitted to the client device not only may serve as a guide for the user of the client device but also may serve as a conduit via which the client device may control one or more device settings in response to any device control gesture received from the user.

According to one implementation of the alternative indirect control embodiment, upon receipt of the video feed from the one or more video capture devices, the motion control application may decode raw video data from the video feed to determine the presence of any device control gesture received from the user by at least one of the one or more video capture devices. Based upon the decoded video feed, the motion control application then may send to the client device gesture metadata. In this implementation, the motion control application may send to the client device only the gesture metadata, or the motion control application may send to the client device all information related to the video feed, including both raw video data and the gesture metadata. According to another implementation of the alternative indirect control embodiment, upon receipt of the video feed from the one or more video capture devices, the motion control application may send to the client device only raw video data from the video feed. In this implementation, the client device may decode the raw video data to determine the presence of any device control gesture received from the user via the one or more video capture devices. Alternatively, in this implementation the client device may send the raw video data received from the motion control application to another device in the motion control environment, which in turn may decode the raw video data to determine the presence of any device control gesture received from the user and then may return to the client device gesture metadata based upon the decoded video feed.

The motion control application may decode or otherwise process video feed data with respect to both overt and covert device control gestures received from the user of the client device. For instance, an overt device control gesture received from the user may entail a raised hand corresponding to a request to adjust upward the volume of the client device. As a further example, an overt device control gesture received from the user may entail a single index finger over the mouth corresponding to a request to mute the volume of the client device. As a further example, a covert device control gesture received from the user may entail a handshake with a second user corresponding to a request to share information of the client device with a device in the possession of the second user.

At step 325, the motion control application may discontinue the communication session established at step 305 and the video feed transmitted according to step 320 upon occurrence of a discontinuation event. In an embodiment, the discontinuation event may include receipt of a discontinuation request from the user. Additionally or alternatively, the discontinuation event may include confirmation that the user has left a specified optical range of each of the one or more video capture devices. Additionally or alternatively, the discontinuation event may include satisfaction of one or more discontinuation rules associated with the video feed. In an embodiment, the one or more discontinuation rules may pertain to at least one of time allotment, cost allotment, a priority metric change, or a security risk change. For instance, a discontinuation rule associated with the video feed may entail requiring that the communication session and the video feed be discontinued after a predetermined time period. A further discontinuation rule associated with the video feed may entail requiring that the communication session and the video feed be discontinued once provision of the video feed exceeds a predetermined cost with respect to money or resources. A further discontinuation rule associated with the video feed may entail requiring that the communication session and the video feed be discontinued once a priority metric associated with the video feed is reduced to a predetermined level. A further discontinuation rule associated with the video feed may entail requiring that the communication session and the video feed be discontinued once a security risk associated with the video feed rises to or exceeds a predetermined level.

Figure 4:
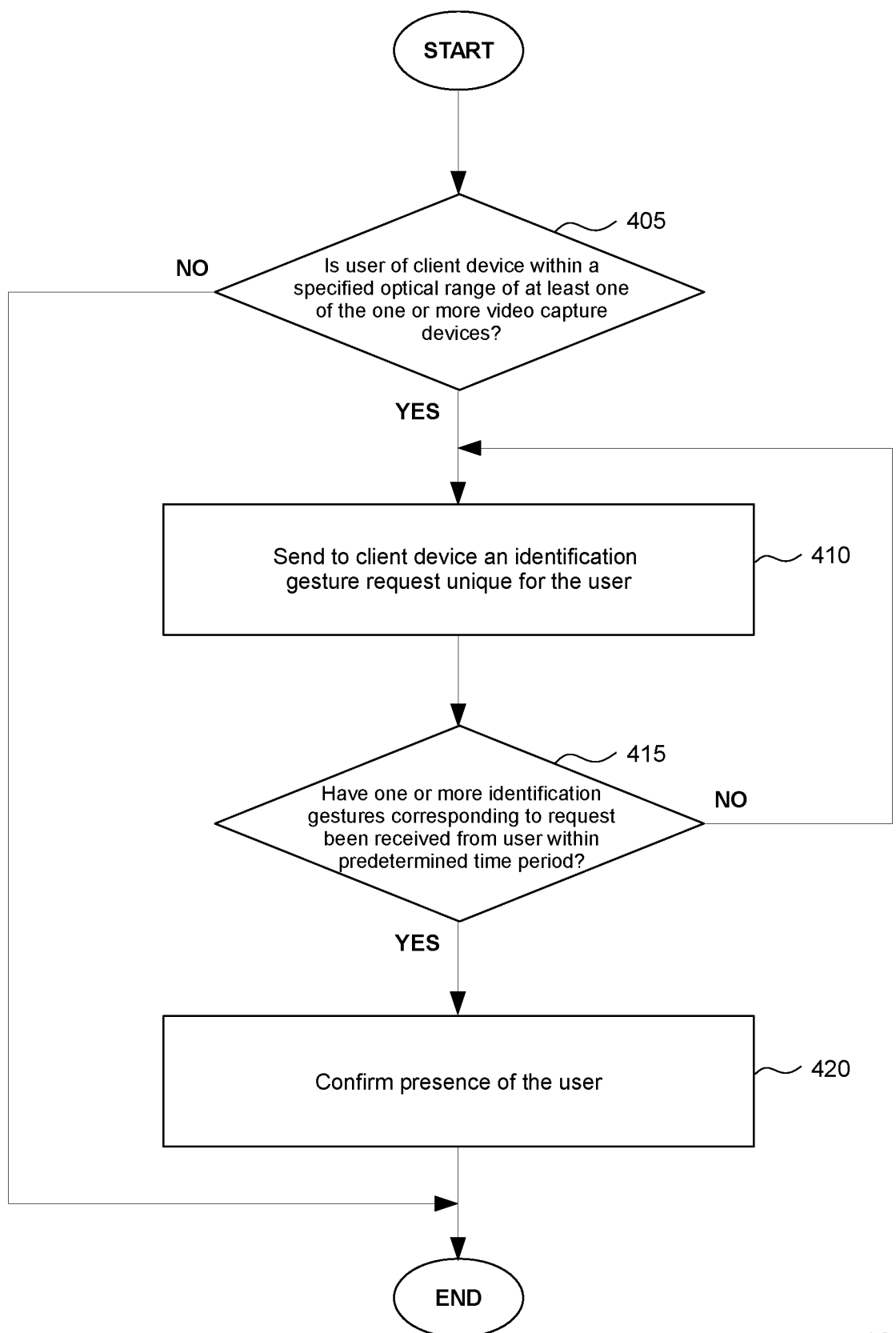
FIG. 4 illustrates a method of identifying a user of a client device via one or more video capture devices, according to an embodiment.

FIG. 4 illustrates method 400 of identifying the user of the client device via the one or more video capture devices. The method 400 provides an example embodiment with respect to step 310 of the method 300. The method 400 may begin at step 405, where the motion control application may determine whether the user is within a specified optical range of at least one of the one or more video capture devices. Upon determining at step 405 that the user is not within the specified optical range of at least one of the one or more video capture devices, the method 400 may end. Upon determining at step 405 that the user is within the specified optical range of at least one of the one or more video capture devices, at step 410 the motion control application may send to the client device an identification gesture request unique for the user. The identification gesture request sent according to step 410 may stipulate that the user provide one or more user-specific identification gestures. In an embodiment, the motion control application may send the identification gesture request in the form of an audio signal, which may be transmitted to the audio device communicably coupled to the client device, a speaker of the client device, or another device communicably coupled to the client device having a capability to present a manifestation of the audio signal. Additionally or alternatively, the motion control application may send the identification gesture request in the form of a vibration signal, which may be transmitted to the vibration device communicably coupled to the client device, a vibration module of the client device, or another device communicably coupled to the client device having vibration capability.

At step 415, the motion control application may determine whether one or more identification gestures corresponding to the identification gesture request have been received from the user within a predetermined identification time period via at least one of the one or more video capture devices. Upon determining at step 415 that no identification gesture corresponding to the identification gesture request has been received from the user within the predetermined identification time period, then the motion control application may return to step 410, and the motion control application may re-send to the client device the identification gesture request unique for the user. Upon determining at step 415 that one or more identification gestures corresponding to the identification gesture request have been received from the user within the predetermined identification time period, then at step 420 the motion control application may confirm presence of the user. In an embodiment, consequent to confirming presence of the user, the motion control application may send an identification confirmation message to the client device in the form of an audio signal, which may be transmitted to the audio device communicably coupled to the client device, a speaker of the client device, or another device communicably coupled to the client device having a capability to present a manifestation of the audio signal. Additionally or alternatively, the motion control application may send an identification confirmation message to the client device in the form of a vibration signal, which may be transmitted to the vibration device communicably coupled to the client device, a vibration module of the client device, or another device communicably coupled to the client device having a vibration capability.

Figure 5:
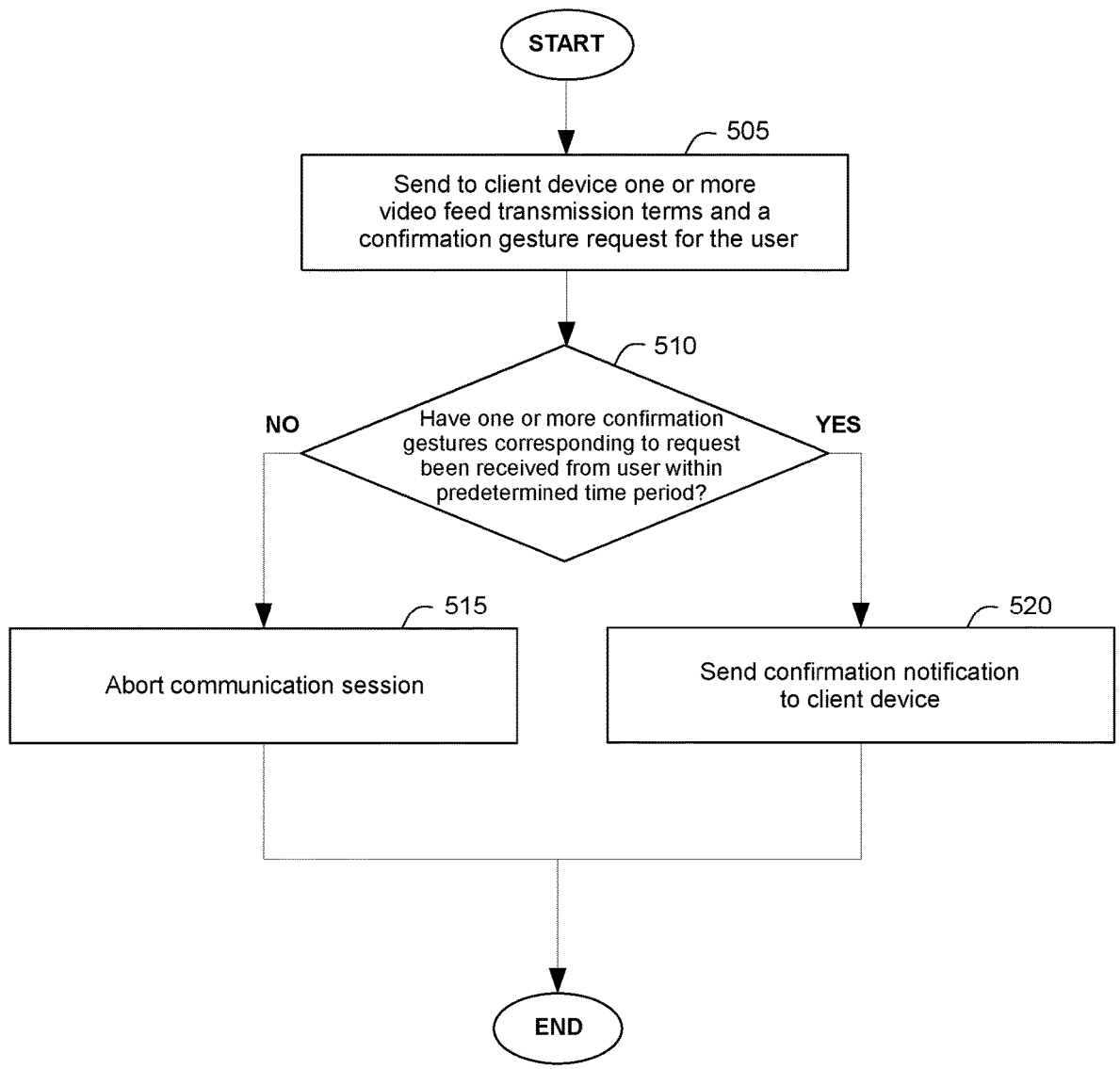
FIG. 5 illustrates a method of negotiating parameters of a video feed, according to an embodiment.

FIG. 5 illustrates method 500 of negotiating parameters of the video feed. The method 500 provides an example embodiment with respect to step 315 of the method 300. The method 500 may begin at step 505, where the motion control application may send to the client device one or more video feed transmission terms and a confirmation gesture request for the user. According to an embodiment, the one or more video feed transmission terms may include one or a combination of transmission cost, communication method, bandwidth, image quality of the video feed, user image size for the video feed, security parameters with respect to the video feed, or privacy parameters with respect to the video feed. In an embodiment, the motion control application may determine transmission cost based in part upon the identity of the user. For instance, the motion control application may transmit the video feed without cost or at a reduced cost to a user affiliated with a designated group or connected via an online network to a designated individual or group. As another example, the motion control application may transmit the video feed without cost or at a reduced cost to a user within a predetermined geographic range, such as within the confines of a particular building. In a further embodiment, the motion control application may determine bandwidth, image quality of the video feed, or user image size for the video feed based upon cost considerations or respective processing capabilities of the client device or the one or more video capture devices. In a further embodiment, the motion control application may determine user image size for the video feed based upon a range of expected gestures to be communicated by the user of the client device (e.g., an image of the upper body of the user may be necessary if there is an expectation that the user will communicate any gesture that requires use of the user's arms). In a further embodiment, the motion control application may determine user image size for the video feed based upon security or privacy concerns with respect to inclusion of the user in the video feed. In a further embodiment, the motion control application may restrict transmission or subsequent use of the video feed based upon security or privacy concerns with respect to potential circulation of the video feed.

The confirmation gesture request sent according to step 505 may stipulate that the user of the client device review and accept each of the one or more video feed transmission terms and further may stipulate that the user provide one or more confirmation gestures. In an embodiment, the motion control application may send the confirmation gesture request in the form of an audio signal, which may be transmitted to the audio device communicably coupled to the client device, a speaker of the client device, or another device communicably coupled to the client device having a capability to present a manifestation of the audio signal. Additionally or alternatively, the motion control application may send the confirmation gesture request in the form of a vibration signal, which may be transmitted to the vibration device communicably coupled to the client device, a vibration module of the client device, or another device communicably coupled to the client device having a vibration capability.

At step 510, the motion control application may determine whether one or more confirmation gestures corresponding to the confirmation gesture request have been received from the user within a predetermined confirmation time period via at least one of the one or more video capture devices. Upon determining at step 510 that no confirmation gesture corresponding to the confirmation gesture request has been received from the user within the predetermined confirmation time period, then at step 515 the motion control application may abort the communication session established at step 305 of the method 300, and the method 500 may end. Upon determining at step 510 that one or more confirmation gestures corresponding to the confirmation gesture request have been received from the user within the predetermined confirmation time period, then at step 520 the motion control application may send a confirmation notification to the client device, and the method 500 may end. In an embodiment, the motion control application may send the confirmation notification to the client device in the form of an audio signal, which may be transmitted to the audio device communicably coupled to the client device, a speaker of the client device, or another device communicably coupled to the client device having a capability to present a manifestation of the audio signal. Additionally or alternatively, the motion control application may send the confirmation notification to the client device in the form of a vibration signal, which may be transmitted to the vibration device communicably coupled to the client device, a vibration module of the client device, or another device communicably coupled to the client device having a vibration capability.

By enabling client device motion control, the various embodiments described herein may facilitate client device control in scenarios in which conventional control techniques (e.g., via buttons or via voice commands) are infeasible or impossible.

While the foregoing description is directed to various embodiments, such description is not intended to limit the scope of the invention. All kinds of modifications made to the described embodiments and equivalent arrangements should fall within the protected scope of the invention. Hence, the scope of the invention should be explained most widely according to the claims that follow in connection with the detailed description, and should cover all the possibly equivalent variations and equivalent arrangements. Accordingly, further embodiments may be devised without departing from the basic scope of the invention.

What is claimed is:

1. A method comprising:
    establishing, via a communications network, a communication session between a client device and one or more video capture devices;
    identifying a user of the client device via the one or more video capture devices;
    negotiating parameters of a video feed for transmission from the one or more video capture devices to the client device via the communication session, wherein negotiating the parameters of the video feed comprises sending to the client device one or more video feed transmission terms and a confirmation gesture request for the user, wherein the one or more video feed transmission terms include transmission cost, and wherein the transmission cost is determined at least in part based upon presence of the user within a predetermined location or geographic range; and
    upon transmission of the video feed from the one or more video capture devices to the client device, facilitating control of the client device in response to any device control gesture received from the user based upon the video feed.

2. The method of claim 1, further comprising:
    discontinuing the communication session and the video feed upon occurrence of a discontinuation event.

3. The method of claim 2, wherein the discontinuation event comprises confirmation that the user has left a specified optical range of each of the one or more video capture devices.

4. The method of claim 2, wherein the discontinuation event comprises satisfaction of one or more discontinuation rules associated with the video feed.

5. The method of claim 1, wherein establishing the communication session comprises initiating the communication session upon receiving from the user one or more initiation gestures via at least one of the one or more video capture devices.

6. The method of claim 1, wherein establishing the communication session comprises broadcasting availability of the one or more video capture devices to the client device upon determining that the user is within a specified optical range of at least one of the one or more video capture devices.

7. The method of claim 1, wherein establishing the communication session comprises initiating the communication session upon receipt of a signal from the client device indicating that the client device is within a predetermined geographical range of at least one of the one or more video capture devices.

8. The method of claim 1, wherein identifying the user of the client device comprises confirming presence of the user via recognition of one or more physical characteristics associated with the user.

9. The method of claim 1, wherein identifying the user of the client device comprises:
    upon determining that the user is within a specified optical range of at least one of the one or more video capture devices, sending to the client device an identification gesture request unique for the user; and
    upon receiving from the user one or more identification gestures corresponding to the identification gesture request within a predetermined identification time period via at least one of the one or more video capture devices, confirming presence of the user.

10. The method of claim 1, wherein negotiating the parameters of the video feed further comprises:
    upon receiving from the user one or more confirmation gestures corresponding to the confirmation gesture request within a predetermined confirmation time period via at least one of the one or more video capture devices, sending a confirmation notification to the client device.

11. The method of claim 2, wherein the discontinuation event comprises receipt of a discontinuation request from the user.

12. The method of claim 1, wherein identifying the user of the client device comprises confirming presence of the user via confirmation of a location of the client device relative to the one or more video capture devices.

13. The method of claim 4, wherein a discontinuation rule among the one or more discontinuation rules requires that the communication session and the video feed be discontinued after a predetermined time period.

14. The method of claim 4, wherein a discontinuation rule among the one or more discontinuation rules requires that the communication session and the video feed be discontinued once provision of the video feed exceeds a predetermined cost with respect to money or resources.

15. The method of claim 4, wherein a discontinuation rule among the one or more discontinuation rules requires that the communication session and the video feed be discontinued once a priority metric associated with the video feed is reduced to a predetermined level.

16. The method of claim 4, wherein a discontinuation rule among the one or more discontinuation rules requires that the communication session and the video feed be discontinued once a security risk associated with the video feed rises to or exceeds a predetermined level.

17. The method of claim 6, wherein the communication session is established upon receiving an affirmative response from either the client device or the user.

18. The method of claim 1, wherein the transmission cost is determined at least in part based upon an affiliation of the user with a designated group or a connection of the user via an online network to a designated entity.

19. The method of claim 1, wherein the one or more video feed transmission terms further include at least one term selected from the group consisting of communication method, bandwidth, image quality of the video feed, and user image size for the video feed.

* * * * *